US011738677B1

(12) United States Patent
Salter et al.

(10) Patent No.: US 11,738,677 B1
(45) Date of Patent: Aug. 29, 2023

(54) VEHICLE HAVING DEPLOYABLE ASSIST HANDLE AND METHOD

(71) Applicant: Ford Global Technologies, LLC, Dearborn, MI (US)

(72) Inventors: Stuart C. Salter, White Lake, MI (US); Hussein H. Berry, Dearborn, MI (US); Brendan Diamond, Grosse Pointe, MI (US); Lucretia Williams, Bloomfield Hills, MI (US); Annette Lynn Huebner, Highland, MI (US); Benjamin Yilma, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/826,517

(22) Filed: May 27, 2022

(51) Int. Cl.
*B60N 3/02* (2006.01)
(52) U.S. Cl.
CPC .................................... *B60N 3/023* (2013.01)
(58) Field of Classification Search
CPC ........... B60N 3/02; B60N 3/023; B60N 3/026
USPC ....................................................... 296/1.02
See application file for complete search history.

(56) References Cited

U.S. PATENT DOCUMENTS

| 5,104,169 | A | * | 4/1992 | Kopnski | .................. | A61G 3/06 5/81.1 R |
| 6,418,594 | B1 | | 7/2002 | Miller | | |
| 10,391,846 | B2 | * | 8/2019 | Felix Frias | .............. | B60R 5/04 |
| 11,072,269 | B2 | * | 7/2021 | Grosch | .................... | B60J 5/101 |
| 11,351,901 | B1 | * | 6/2022 | Kozu | ..................... | B60N 3/023 |
| 2018/0111455 | A1 | * | 4/2018 | Felix Frias | ............ | B60N 3/023 |
| 2018/0258679 | A1 | * | 9/2018 | Topolovec | .............. | B60J 5/101 |
| 2020/0064444 | A1 | | 2/2020 | Regani et al. | | |

FOREIGN PATENT DOCUMENTS

| CN | 209972258 | U | * | 1/2020 | | |
| CN | 113415223 | A | * | 9/2021 | ............. | B60N 3/026 |
| KR | 0113792 | Y1 | | 3/1995 | | |
| KR | 100377144 | B1 | | 3/2003 | | |
| KR | 102178125 | B1 | | 11/2020 | | |

* cited by examiner

*Primary Examiner* — Jason S Morrow
(74) *Attorney, Agent, or Firm* — Vichit Chea; Price Heneveld LLP

(57) ABSTRACT

A vehicle includes a cabin interior, a support structure within or proximate to the cabin interior, and a deployable assist handle coupled to the support structure. The deployable assist handle includes a handle body, a flexible member coupled to the handle body, a reel configured to receive the flexible member, an actuator operatively coupled to the reel to actuate the reel to extend and retract the flexible member, at least one sensor for sensing a user proximate to the vehicle and generating sensed data based on the sensed user, and a controller determining one or more characteristics of the user from the sensed data and controlling the actuator to actuate the deployable assist handle assembly to adjust a length of the flexible member based on the determined one or more characteristics of the user.

16 Claims, 5 Drawing Sheets

VEHICLE HAVING DEPLOYABLE ASSIST HANDLE AND METHOD

FIELD OF THE DISCLOSURE

The present disclosure generally relates to vehicle assist handles, and more particularly relates to a vehicle having an extendable assist handle.

BACKGROUND OF THE DISCLOSURE

Automotive vehicles are commonly equipped with handle structures referred to as passenger assist handles for passengers to grasp with their hand when entering and exiting the vehicle. Assist handles are commonly fixed to a support in the vehicle. Some assist handles may pivot between stowed and use positions. It may be desirable to provide for an assist handle that may accommodate characteristics of a user.

SUMMARY OF THE DISCLOSURE

According to a first aspect of the present disclosure, a vehicle is provided and includes a cabin interior, a support structure within or proximate to the cabin interior, and a deployable assist handle coupled to the support structure. The deployable assist handle includes a handle body, a flexible member coupled to the handle body, a reel configured to receive the flexible member, an actuator operatively coupled to the reel to actuate the reel to extend and retract the flexible member, at least one sensor for sensing a user proximate to the vehicle and generating sensed data based on the sensed user, and a controller determining one or more characteristics of the user from the sensed data and controlling the actuator to actuate the deployable assist handle to adjust a length of the flexible member based on the determined one or more characteristics of the user.

Embodiments of the first aspect of the present disclosure can include any one or a combination of the following features:
- the deployable assist handle is located proximate to a door opening on the vehicle;
- the support structure is located above the door in a headliner;
- the deployable assist handle is extendable to a plurality of extended positions to present the handle at different heights;
- the flexible member comprises at least one of a belt, a strap, a rope, a chain and a wire;
- the determined one or more characteristics of the user includes one or more measured dimensions of the user;
- the one or more measured dimensions of the user includes length of an arm of the user;
- the at least one sensor comprises at least one imaging camera;
- the at least one imaging camera captures images of a user proximate to the vehicle and the controller processes the images and determines the characteristics of the user from the images; and
- the at least one sensor further comprises at least one of a radar and ultrasonic sensor.

According to a second aspect of the present disclosure, a vehicle is provided and includes a cabin interior, a support structure within or proximate to a headliner in the cabin interior proximate on upper region of a door opening, and a deployable assist handle coupled to the support structure. The deployable assist handle includes a handle body, a flexible member coupled to the handle body, wherein the flexible member comprises at least one of a belt, a strap, a rope, a chain and a wire, and a reel configured to receive the flexible member. The deployable assist handle also includes an actuator operatively coupled to the reel to actuate the reel to extend and retract the flexible member, at least one sensor for sensing a user proximate to the vehicle and generating sensed data based on the sensed user, and a controller determining one or more characteristics of the user from the sensed data and controlling the actuator to actuate the deployable assist handle to adjust a length of the flexible member to present the handle body at a height based on the determined one or more characteristics of the user.

According to a third aspect of the present disclosure, a method of deploying a deployable handle on a vehicle is provided. The method including the steps of providing a deployable assist handle configured to be gripped by a user, the deployable assist handle comprising a flexible member coupled to a handle body and operatively coupled to a reel, sensing a user proximate the vehicle with at least one sensor generating sensed data, determining one or more characteristics of the user from the sensed data, and controlling an actuator to actuate the reel to extend and retract the flexible member so the handle body is presented at a determined length based on the determined one or more characteristics.

Embodiments of the third aspect of the present disclosure can include any one or a combination of the following features:
- the deployable assist handle is located proximate to a door on the vehicle;
- the deployable assist handle is located above the door and is extendable amongst a plurality of heights;
- the support structure is located in a headliner;
- the determined one or more characteristics of the user includes measured dimensions of the user;
- the measured dimensions include height of the user and a length of an arm of the user;
- the at least one sensor comprises at least one imaging camera;
- the at least one imaging camera captures images of a user proximate to the vehicle and the controller processes the images and determines the characteristics of the user from the images; and
- the at least one sensor further comprises at least one of a radar and ultrasonic sensor.

These and other features, advantages, and objects of the present invention will be further understood and appreciated by those skilled in the art by reference to the following specification, claims, and appended drawings.

DETAILED DESCRIPTION OF PREFERRED EMBODIMENTS

Figure 1:
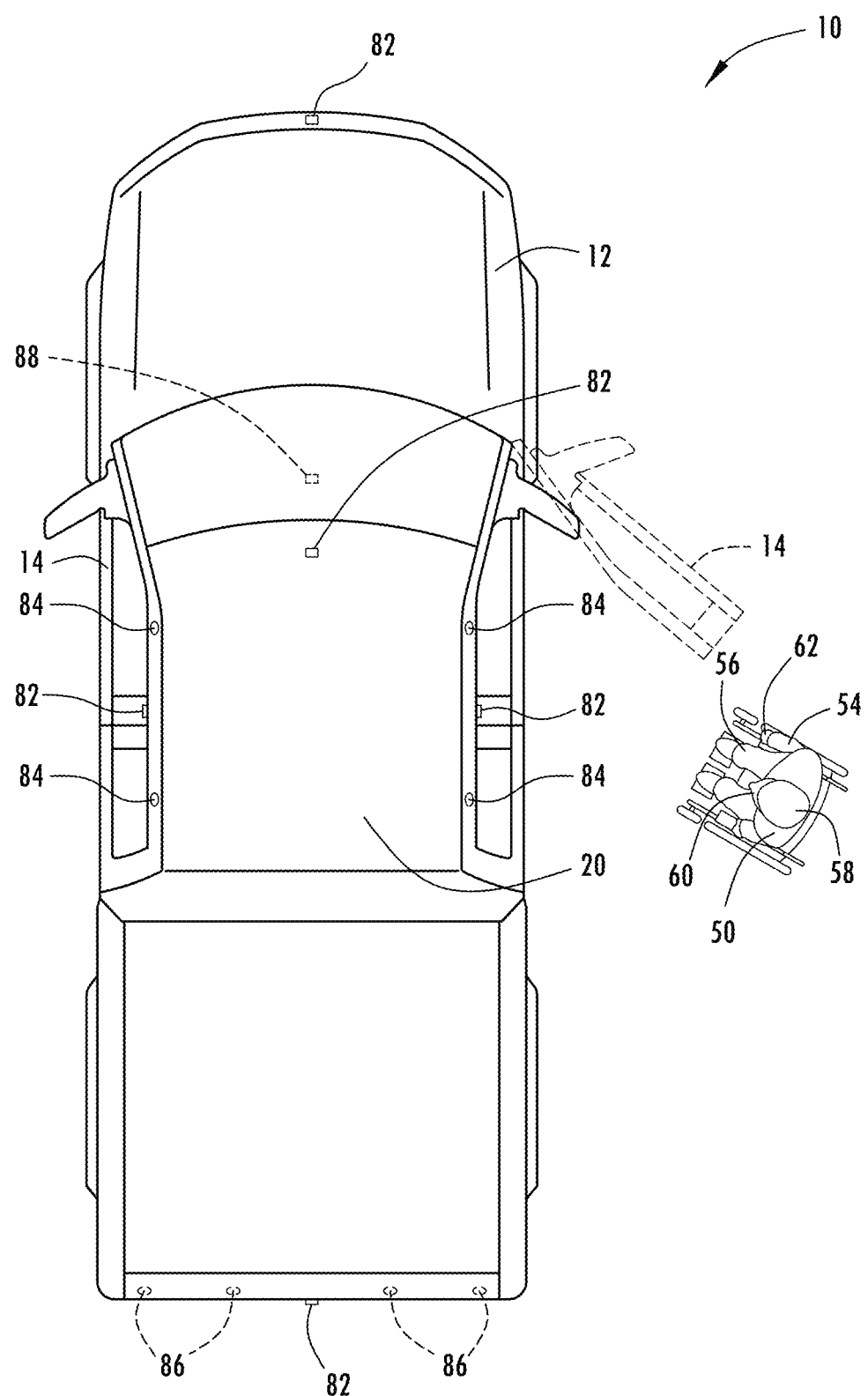
FIG. 1 is a top schematic view of a motor vehicle equipped with deployable assist handles and sensors for sensing a user and control the assist handles, according to one embodiment.

Reference will now be made in detail to the present preferred embodiments of the disclosure, examples of which are illustrated in the accompanying drawings. Wherever possible, the same reference numerals will be used throughout the drawings to refer to the same or like parts. In the drawings, the depicted structural elements are not to scale and certain components are enlarged relative to the other components for purposes of emphasis and understanding.

As required, detailed embodiments of the present disclosure are disclosed herein; however, it is to be understood that the disclosed embodiments are merely exemplary of the invention that may be embodied in various and alternative forms. The figures are not necessarily to a detailed design; some schematics may be exaggerated or minimized to show function overview. Therefore, specific structural and functional details disclosed herein are not to be interpreted as limiting, but merely as a representative basis for teaching one skilled in the art to variously employ the present invention.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a vehicle having sensors and a deployable assist handle and method. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Figure 2:
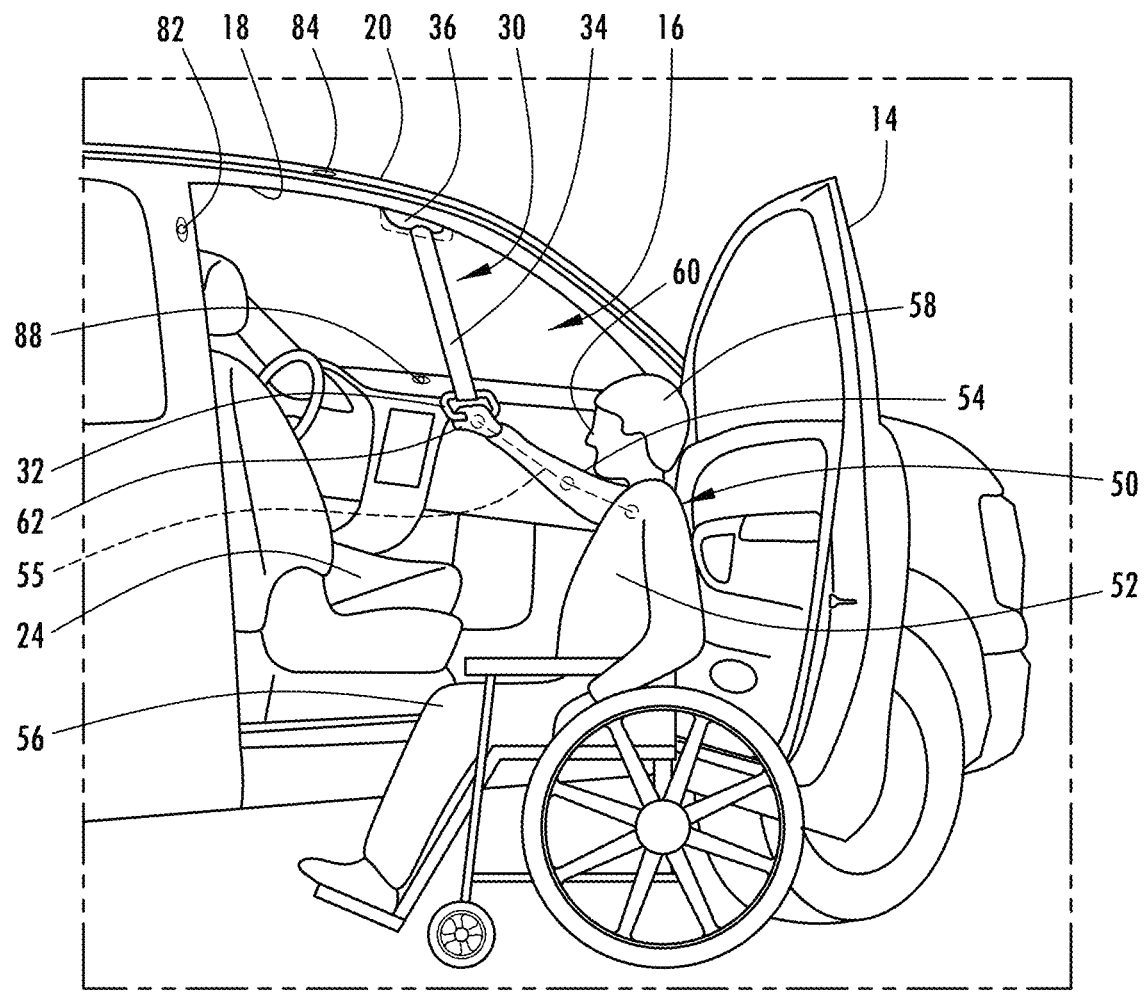
FIG. 2 is a side perspective view of the cabin interior of the vehicle illustrating a deployable assist handle in a use position with a user engaging the handle.

Referring to FIGS. 1 and 2, a wheeled automotive or motor vehicle 10 is generally illustrated having a cabin interior 16 defined by a vehicle body 12 and configured with passenger seating including a front row of seats 24 and a rear row of seats for transporting passengers in the vehicle 10. The cabin interior 16 is generally defined by the vehicle body 12 which may include one or more doors 14 and a roof 20 on the top side. The arrangement of seats includes a driver seat forward of a steering wheel and a passenger seat 24 both on opposite lateral sides in the front row, and one or more rear seats defining a second row. Each of the rows of seats are generally aligned with a corresponding door 14 on each side to allow ingress and egress to the vehicle cabin interior 16. The roof 20 includes a headliner 18 generally disposed on the bottom surface thereof.

The motor vehicle 10 includes one or more deployable assist handles 30. In the example shown, the motor vehicle 10 has an assist handle located proximate to and reachable through the opening shown with the open door 14. However, the motor vehicle 10 may include assist handles 30 located proximate to the doors 14 on the left and right sides of each of the front and rear rows of seating. The assist handles may be mounted to the headliner 18 on the roof 20 at locations proximate to the doors 14. As such, each assist handle is positioned to enable a user, such as a passenger, to engage and grip the assist handle 30 with a hand for support while entering the vehicle 10, exiting the vehicle 10, or for support while traveling in the vehicle 10. For example, a passenger may reach and grip the assist handle 30 in an extended position for ease in entering the vehicle 10. According to another example, the passenger may grip the assist handle 30 for ease in exiting the vehicle 10. According to a further example, a user, such as a passenger, may grip the assist handle 30 while traveling in the vehicle 10, such as traveling on rough terrain, for purposes of maintaining balance and stability. While the assist handle 30 is shown located on the headliner 18, it should be appreciated that the assist handle 30 may be located elsewhere on the vehicle 10 operatively coupled to a supporting structure, preferably proximate to a door such as on a door pillar of the vehicle 10.

The assist handle 30 is a deployable assist handle that may be actuated between a retracted position and a plurality of extended use positions, depending on a sensed user and sensed characteristics of the user. The vehicle 10 is equipped with at least one sensor for sensing a user such as a passenger in the form of a person proximate to the vehicle 10. More specifically, the at least one sensor may sense a user proximate to and approaching the vehicle 10 in an attempt to enter the vehicle 10. The at least one sensor may sense dimensions of the user including height of the user, length of the legs of the user, and length of the arms of the user, for example. In addition, the at least one sensor may sense the gait of the user which is the movement of the user which may be acquired by monitoring a sequence of poses of the user. Further, the at least one sensor may detect the speed of the user approaching the vehicle 10. Based on the sensed characteristics of the user, including height of the user, leg length, arm length, gait of the user and speed of the user, the deployable assist handle 30 may be actuated to one of a plurality of extended positions to accommodate the sensed characteristics of the user and enhance the access by the user of the vehicle 10. This may occur when the user approaches and reaches towards the door opening when the door proximate thereto opens. It should be appreciated that the at least one sensor may also sense the user seated in the vehicle and may deploy the deployable assist handle 30 to one of a plurality of extended positons at different heights based on the sensed characteristics of the user when the user reaches for the handle and the door opens.

The vehicle 10 is shown equipped with a plurality of sensors 80 that are located and oriented on the vehicle 10 for sensing objects such as potential users, e.g., driver and passengers. The at least one or more sensors used to sense characteristics of the user to control the assist handle 30 may include one or more of the plurality of sensors 80. The sensors which are shown in FIG. 1 may include a plurality of exterior imaging sensors 82, also referred to as cameras, located on the exterior of the vehicle 10. The exterior imaging sensors 82 may acquire images within a space nearby (e.g., within a few meters) and surrounding the vehicle 10, particularly proximate to one or more doors of the vehicle 10. One or more interior imaging sensors 88 may detect a user seated within the vehicle 10 or located within the cabin interior 16. The plurality of exterior imaging sensors include exterior imaging sensors 82 on opposite lateral sides of the vehicle proximate to the side passenger doors, a front exterior imaging camera 82, and a rear exterior imaging camera 82. The interior sensor 88 may include one or more cameras oriented to capture images within the cabin interior 16 including a region where a user may be seated. Imaging sensors 80 may acquire images of zones in the space nearby and around the perimeter of the vehicle 10 and within the vehicle 10. The acquired images may be processed by a controller using video processing to identify objects such as one or more people as potential users and the position and characteristics of the users.

The plurality of sensors 80 may also include a plurality of radar sensors 84 shown located on an exterior of the vehicle 10. In the example shown, four radar sensors 84 are shown located on opposite left and right lateral sides of the vehicle 10 proximate to the passenger side doors. The radar sensors 84 transmit radio waves and process their reflections from one or more objects to determine distance to the object(s), speed of the object, and location of the object(s).

The plurality of sensors 80 may further include a plurality of ultrasonic sensors 86. In the example shown, four ultrasonic sensors 86 are shown located at the rear end of the vehicle 10. The ultrasonic sensors 86 may be used to detect location, size and relative distance from the vehicle 10 to the detected object(s). It should be appreciated that other sensors may be employed on the vehicle 10 to sense objects such as potential users proximate to the vehicle 10 and generate sensed signals that may be used to identify each user and characteristics of the user for use in assisting with controlling the actuator for one or more of the deployable assist handles 30 on the vehicle 10. It should be appreciated that the plurality of sensors 80 may be located at any of a number of locations on the vehicle 10 to detect potential users and acquire characteristics of the users.

A user 50 is illustrated in one example approaching the vehicle 10 with the front passenger door 14 in the open position in FIG. 1 and reaching with an arm 54 to grab the assist handle 30 with a hand 62 in FIG. 2. In this example, the user is illustrated as a physically challenged or handicapped person seated in a wheel chair. The user 50 may require assistance to enter the vehicle 10 such as with the use of the assist handle 30.

In this scenario, the at least one sensor, such as the exterior imaging camera 82 detects the user and acquires sensed characteristic data that may be processed including dimensions of the user such as height, leg length and arm length, gait of the user 50 and speed of the user 50. In addition, the sensed characteristic data may include detecting that the user 50 is seated in a wheelchair or otherwise physically challenged. An image processor associated with the controller may process the acquired images of the user 50. The image processing may process the images of the person as the user 50 to determine dimensions of the user, such as the height of the user from the user's feet to the top of the head 58, the length of the arms 54 and arm reach distance of the user 50, and the length of the legs 56 of the user 50. The image processing may further determine a size of the torso 52 of the user 50 and position and/or height of the arms 54 and hands 62 of the user 50. The image processing may determine the bone structure of the user's arm 54 as shown by lines 55 and may determine an estimated pose of the user from the bone structure. The image processing may monitor the movement of the user 50 as the user 50 approaches the vehicle 10. From the monitored movement of the user 50, the image processing may determine the gait of the user from estimated poses and, with the use of radar or other sensors, may determine the speed of the user approaching the vehicle 10. If the speed is slow, this may be an indication of a user with slow or limited mobility that may need the assist handle extended to a lowered height. As a user approaches the vehicle 10, the deployable assist handle 30 may be extended to one of a plurality of extended positions determined based on the sensed characteristics of the user. For example, if the user is shorter, or has a short arm reach, or has a slow gait and smaller body dimensions, the assist handle 30 may be deployed to a first lowest extended position. If the user is taller and more active, the deployable assist handle may be deployed to a second higher extended position. As such, an optimal position of the assist handle may be determined and the assist handle extended to a height for optimal presentation for ease and entry and exiting of the vehicle 10.

The image processing may determine if a user is in a seated position, such as seated in a wheelchair, or on another type of seat or whether the user is assisted with crutches or a cane or otherwise requiring assistance and may use that determination to control the assist handle 30 to move to a suitable height position. The image processing may further determine if the user is elevated, such as, for example, standing on a curb or step, and may take that into account when adjusting the position of the assist handle.

Figure 3:
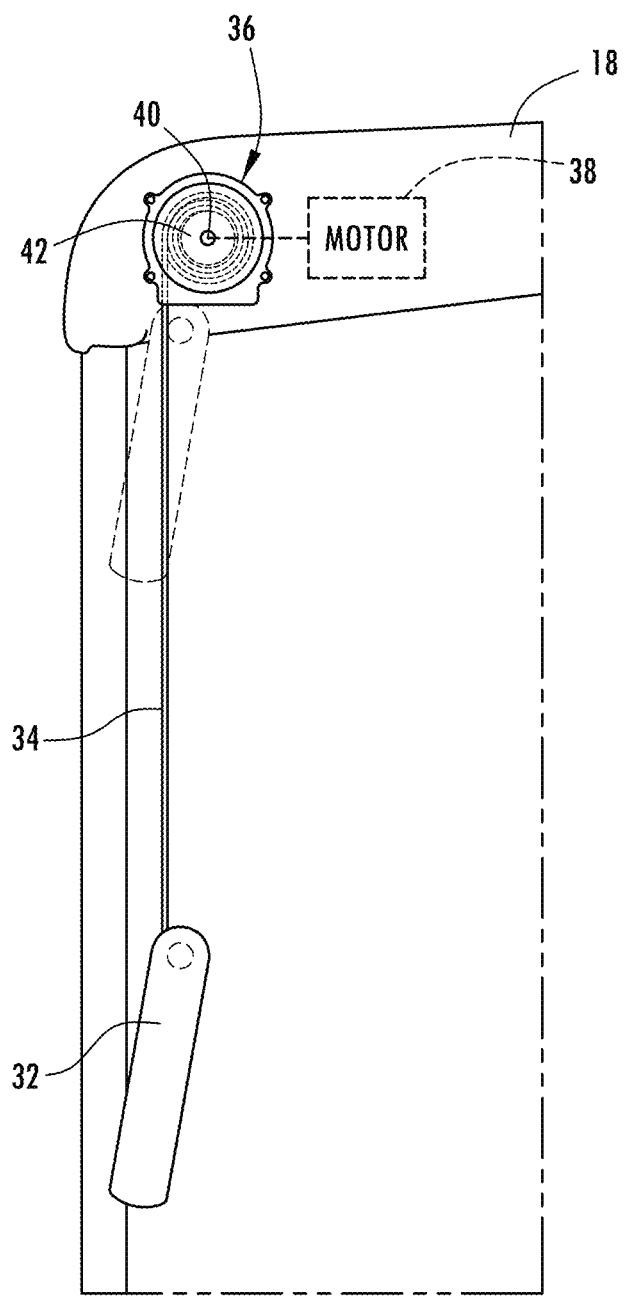
FIG. 3 is an enlarged side view of the deployable assist handle illustrating the assist handle in an extended position and a retracted position.

Referring to FIG. 3, one example of the deployable assist handle 30 is illustrated. The deployable assist handle 30 is shown mounted proximate to the headliner 18 which is below and supported by the roof 20 of the vehicle 10. The assist handle 30 includes a handle body 32 which may be a loop-shaped handle portion connected to a flexible member shown in one example as a belt 34. The handle body 32 may rotate and flex with the flexible member shown as belt 34 and may extend and retract between a retracted position shown positioned upward near the headliner 18 and one of a plurality of downward extended use positions. The extended use positions may vary based on the length of extension of the belt 34 which determines the adjustable height of the handle body 32.

The assist handle 30 includes a reel 36 shown located proximate to the headliner 18 for winding and unwinding the belt 34 to retract and extend, respectively, the belt 34 and handle body 32. The reel 36 includes a spool 42 upon which the flexible member in the form of the belt 34 may be wound and unwound. It should be appreciated that other flexible members, such as a strap, a rope, a chain and a wire that are capable of being wound and unwound on the spool 42 of reel 36 may be employed as the flexible member, according to other examples.

The belt 34 is actuated to extend and retract with the use of an actuator, such as an electric motor 38 driving a motor output shaft 40 which rotates the spool 42 to retract or extend the belt 34. It should be appreciated that the reel 36 may retract the belt 34 with the handle body 32 to a position within a stowed position or at the uppermost position. This may occur after a user has entered the vehicle and the interior camera on the other sensor detects the user is seated on a seat within the vehicle. According to one embodiment, the motor 38 may be used to help forcibly pull the user into the cabin interior of the vehicle by retracting the belt 34. It should be appreciated that when the motor 38 unwinds the belt 34, the belt 34 and handle body 32 are lowered to an extended position due to gravity. As such, a controller may control the motor 38 to actuate and thereby extend or retract the handle body 32 amongst a plurality of extended positions and the fully retracted position. In addition to extending the handle body 32 to different extended use positions, the handle body 32 may flex outward and inward via the belt 34.

The linearly deployable assist handle 30 may be employed to extend linearly downward and upward to different heights. It should be appreciated the deployable assist handle 30 may otherwise be configured to provide a plurality of extended use positions, according to other embodiments. According to a further example, a linear deployable assist handle may be positioned within a pillar of the vehicle 10 and movable amongst a plurality of positions at different extendable heights.

Figure 4:
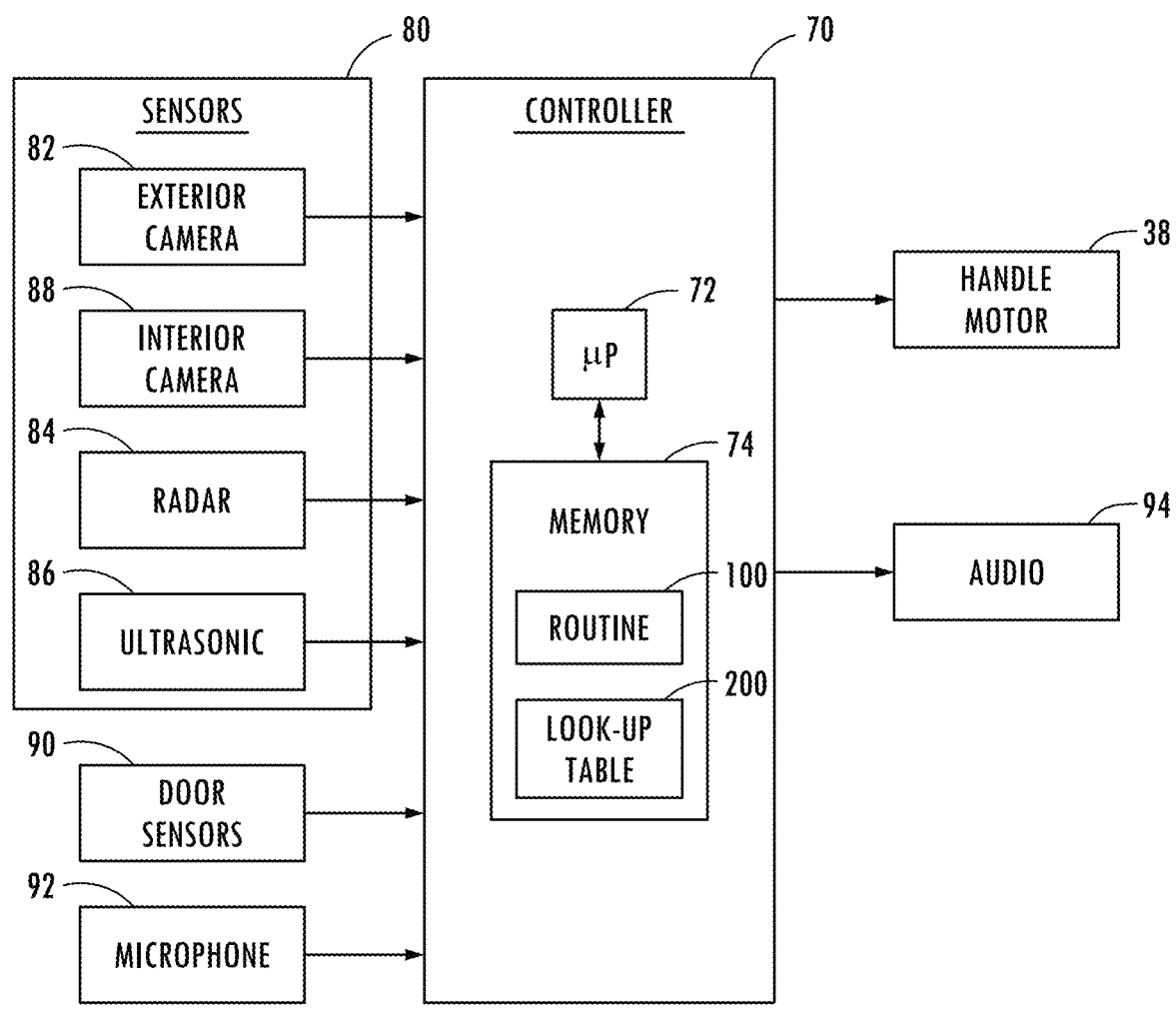
FIG. 4 is a block diagram of a vehicle controller configured to detect user characteristics and control a handle actuator for the deployable assist handle, according to one embodiment.

Referring to FIG. 4, the vehicle 10 is shown having a controller 70 that monitors various inputs from the sensors 80, including from the imaging sensors 82 and 88, radar 84, and ultrasonic sensors 86 and generates output signals that are processed by the controller 70 to control the handle actuator 38 associated with the assist handle 30. The controller 70 may also receive sensed signals from door sensors 90 associated with the vehicle doors which may indicate open or closed door positions. In addition, the controller may receive user voice commands via a microphone 92. The controller 70 may include control circuitry, such as a microprocessor 72 and memory 74. It should be appreciated that the controller 70 may be a dedicated or shared controller and may be comprised of analog and/or digital control circuitry. Stored in memory 74 are one or more control routines including routine 100 which may be executed by the microprocessor 72. In addition, one or more lookup tables 200 may be stored in memory 74 and processed by the microprocessor 72. The lookup tables 200 may include tables of stored data that provide assist handle positions based on sensed characteristics such as height of the user, leg length of the user, arm length of the user, gait of the user, and speed of the user, for example. The controller 70 processes the various inputs to detect characteristics of a user and actuates the handle motor 38 to control the position of the assist handle to present the assist handle at an optimal position and assist a user in entering or exiting the vehicle 10. The controller 70 may also output audible sounds or messages via audio output 94. For example, a user may verbally input commands to control the assist handle.

Figure 5:
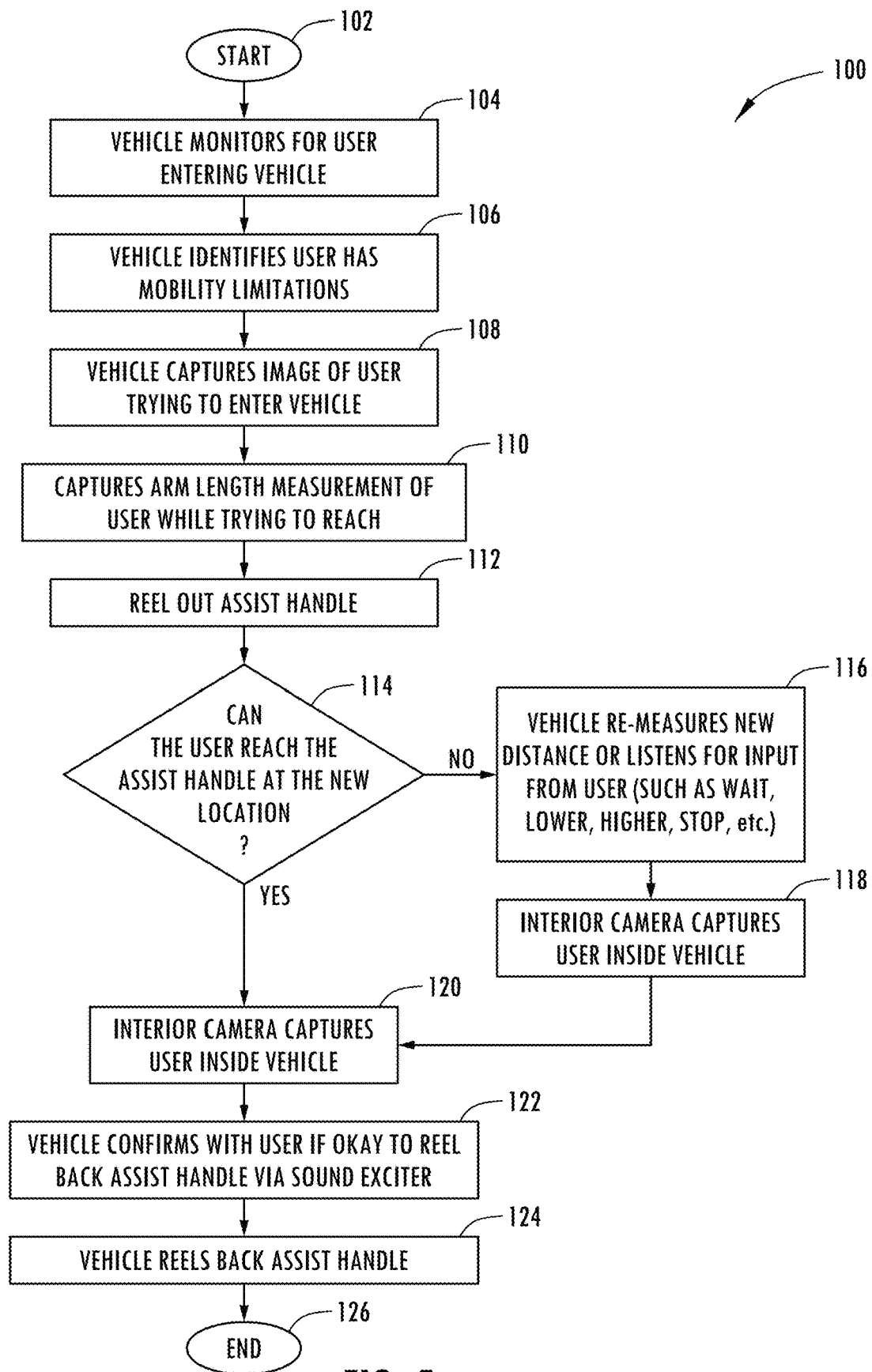
FIG. 5 is a flow diagram illustrating a routine for sensing a user's characteristics and controlling the deployable assist handle, according to one example.

Referring to FIG. 5, the control routine 100 is illustrated, according to one example.

Control routine 100 begins at step 102 and proceeds to step 104 to monitor for a user entering the vehicle and then proceeds to step 106 to identify the user as having mobility limitations. Next, at step 108, routine 100 captures images of the user trying to enter the vehicle, and at step 110 captures the arm length measurement of the user while the user is trying to reach for the assist handle or other support in the vehicle. At step 112, routine 100 activates the motor to unwind the belt to extend the grab handle body to a position within reach of the user.

Routine 100 then proceeds to decision step 114 to determine if the user can reach the grab handle at the new location and, if so, proceeds to step 110 where the interior camera captures the user inside the vehicle. Thereafter, routine 100 confirms with the user if it is okay to wind up the belt to retract the belt and the grab handle via a sound exciter and then to step 124 to reel back the grab handle before ending at step 126. If the user is determined to not be able to reach for the grab handle at the new location, routine 100 proceeds to step 116 where the vehicle remeasures the new distance or listens for an audible input from the customer or user, such as a command, such as wait, lower, higher, stop, etc. Next, at step 118, the interior camera captures the user inside the vehicle before proceeding to step 120.

Accordingly, the vehicle 10 advantageously provides for a sensing arrangement and deployable assist handle 30 that deploys to a position depending on the sensed characteristics of a user. This advantageously allows for an optimal height or position of the assist handle 30 to allow a user to enter or exit the vehicle 10.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A vehicle comprising:
 a cabin interior;
 a support structure within or proximate to the cabin interior; and
 a deployable assist handle coupled to the support structure, the deployable assist handle comprising:
  a handle body;
  a flexible member coupled to the handle body;
  a reel configured to receive the flexible member;
  an actuator operatively coupled to the reel to actuate the reel to extend and retract the flexible member;
  at least one sensor for sensing a user proximate to the vehicle and generating sensed data based on the sensed user; and
  a controller determining one or more characteristics of the user from the sensed data and controlling the actuator to actuate the deployable assist handle to adjust a length of the flexible member based on the determined one or more characteristics of the user, wherein the determined one or more characteristics of the user includes one or more measured dimensions of the user, and wherein the one or more measured dimensions of the user includes length of an arm of the user.

2. The vehicle of claim 1, wherein the deployable assist handle is located proximate to a door opening on the vehicle.

3. The vehicle of claim 2, wherein the support structure is located above the door in a headliner.

4. The vehicle of claim 1, wherein the deployable assist handle is extendable to a plurality of extended positions to present the handle at different heights.

5. The vehicle of claim 1, wherein the flexible member comprises at least one of a belt, a strap, a rope, a chain and a wire.

6. The vehicle of claim 1, wherein the at least one sensor comprises at least one imaging camera.

7. The vehicle of claim 6, wherein the at least one imaging camera captures images of a user proximate to the vehicle and the controller processes the images and determines the characteristics of the user from the images.

8. The vehicle of claim 6, wherein the at least one sensor further comprises at least one of a radar and ultrasonic sensor.

9. A vehicle comprising:
 a cabin interior;
 a support structure within or proximate to a headliner in the cabin interior proximate an upper region of a door opening; and
 a deployable assist handle coupled to the support structure, the deployable assist handle comprising:
  a handle body;
  a flexible member coupled to the handle body, wherein the flexible member comprises at least one of a belt, a strap, a rope, a chain and a wire;
  a reel configured to receive the flexible member;
  an actuator operatively coupled to the reel to actuate the reel to extend and retract the flexible member;
  at least one sensor for sensing a user proximate to the vehicle and generating sensed data based on the sensed user; and
  a controller determining one or more characteristics of the user from the sensed data and controlling the actuator to actuate the deployable assist handle to adjust a length of the flexible member to present the handle body at a height based on the determined one or more characteristics of the user, wherein the determined one or more characteristics of the user includes one or more measured dimensions of the user, and wherein the one or more measured dimensions of the user includes length of an arm of the user.

10. A method of deploying a deployable handle on a vehicle, the method comprising:
 providing a deployable assist handle configured to be gripped by a user, the deployable assist handle comprising a flexible member coupled to a handle body and operatively coupled to a reel;
 sensing a user proximate the vehicle with at least one sensor generating sensed data;
 determining one or more characteristics of the user from the sensed data; and
 controlling an actuator to actuate the reel to extend and retract the flexible member so the handle body is presented at a determined length based on the determined one or more characteristics, wherein the determined one or more characteristics of the user includes measured dimensions of the user, and wherein the measured dimensions include height of the user and a length of an arm of the user.

11. The method of claim 10, wherein the deployable assist handle is located proximate to a door on the vehicle.

12. The method of claim 11, wherein the deployable assist handle is located above the door and is extendable amongst a plurality of heights.

13. The method of claim 12, wherein the deployable assist handle is coupled to a support structure that is located in a headliner.

14. The method of claim 10, wherein the at least one sensor comprises at least one imaging camera.

15. The method of claim 14, wherein the at least one imaging camera captures images of a user proximate to the vehicle and the controller processes the images and determines the characteristics of the user from the images.

16. The method of claim 14, wherein the at least one sensor further comprises at least one of a radar and ultrasonic sensor.

* * * * *